UNITED STATES PATENT OFFICE.

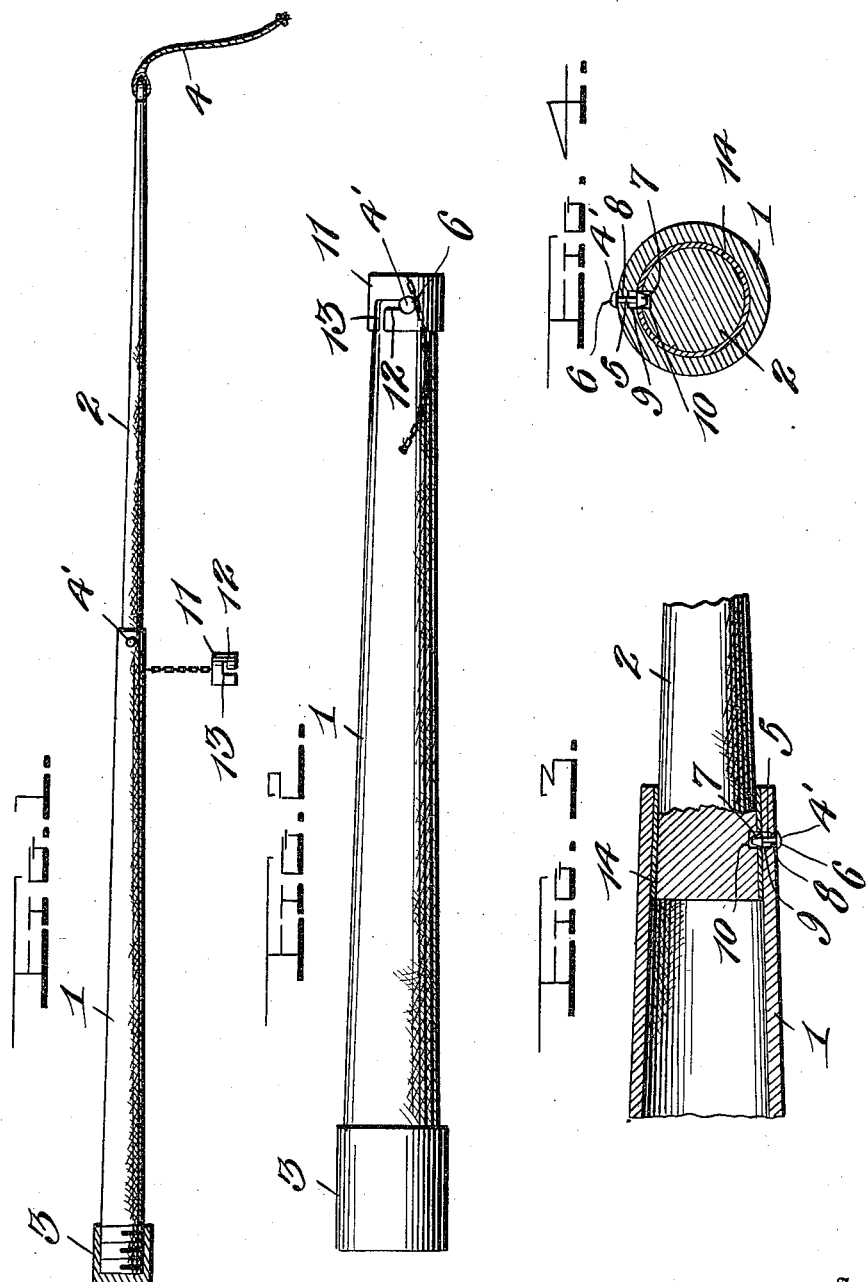

WYLYE G. TOWERY, OF ALAMOGORDO, TERRITORY OF NEW MEXICO.

CARRIAGE-WHIP.

1,013,240.     Specification of Letters Patent.     Patented Jan. 2, 1912.

Application filed February 14, 1911. Serial No. 608,497.

*To all whom it may concern:*

Be it known that I, WYLYE G. TOWERY, a citizen of the United States, residing at Alamogordo, in the county of Otero and Territory of New Mexico, have invented certain new and useful Improvements in Carriage-Whips, of which the following is a specification, reference being had to the accompanying drawings.

This invention is an improved carriage whip which is also adapted to be used as a cane, the invention consisting in the construction, combination and arrangement of devices, hereinafter described and claimed.

The object of my invention is to provide an improved whip of this class comprising a tubular handle member, and an outer member which is telescopically fitted in the handle member, and may be entirely disposed and incased therein, to enable the whip to be used as a cane, and may be extended from the handle member to adapt the whip for use as such, one specific object of the invention being to provide improved means for securing the outer member of the whip to the handle member, when the outer member is adjusted, and extended, another specific object of the invention being to provide in connection with the said securing means, a cap for closing the smaller end of the handle member.

In the accompanying drawings—Figure 1 is partly an elevation and partly a sectional view of a whip constructed in accordance with my invention, showing the outer member extended. Fig. 2 is a similar view showing the outer member in retracted position, incased within the handle member, and the device adapted for use as a cane. Figs. 3 and 4, are detail sectional views on a larger scale.

My improved whip comprises a handle member 1, and an outer member 2. The handle member is tubular in form, and tapers toward one end, its bore also tapering. A cap 3, is provided to close the outer end of the handle member, which cap is removable at will. The outer member 2 of the whip is flexible and may be of the usual or any suitable construction, and is provided at its outer end with the usual cracker or lash 4. The outer member 2, tapers in one direction, and corresponds in size with the tapered bore of the handle member, and is telescopically disposed in the handle member, so that the outer member may be extended from the handle member to form in connection therewith, a whip, or may be withdrawn and entirely disposed and incased in the handle member, to enable the device to be used as a cane. Near the outer end of the handle member, is a locking pin 4', which is provided with a stem 5, an outer head 6, and a tapered locking head 7. The stem of the locking pin operates in a radial opening 8, with which the handle member is provided and the locking head 7 may be moved into and out of a counter-bore 9, at the inner end of the opening 8, the head 6 being disposed on the outer side of the tubular member, and the locking head 7 being adapted to be moved into or out of a radial tapered locking opening 10 with which the outer member 2 of the whip is provided near its butt.

When the outer member 2 is drawn outwardly to the fullest extent from the handle member, its butt which is tapered fits in the outer end of the tapered bore of the handle member, and its opening 10 registers with the locking head 7, of the pin 4', and the pin can then be forced inwardly so as to cause its tapered locking head to engage the said tapered opening 10, and thereby lock the outer member 2, in extended position. When thus disposed, the outer head 6 of the pin bears on the outer side of the handle member.

To permit the outer member 2 to be inclosed and incased in the handle member, the pin 4' is drawn outwardly thereby causing its head 7 to disengage the opening 10. By striking on the butt of the handle member, the outer member will then be drawn into the handle member as will be understood. To lock the outer member, within the handle member, I provide the cap 11 for the smaller end of the handle member, which cap has an annular flange 12 which is provided with one or more bayonet slots 13, for engagement with the stem 5, of the pin 4', the pin thereby locking the cap 11 in place. Hence the pin 4' serves when in one position, to lock the outer member in extended position, and when in another position, serves to lock the cap in place which keeps the outer member incased in the handle member. The outer member may be entirely withdrawn from the handle member by first removing the cap 3.

In practice, and as here shown, the outer member 2 of the whip is provided at its butt with a ferrule or metal band 14 which is slightly tapered, which ferrule or metal band is provided with the opening 10, and is adapted to slide freely and smoothly in the bore of the outer or handle member 1. To prevent the cap 11 from becoming lost, I preferably connect it to the outer end of the handle member by a chain 15. The cap 3 is here shown as threaded on the butt or large end of the handle member, and in practice, the said cap may be ornamented. It will be understood that when the device is in use as a cane, the cap 3 forms the head of the cane, and the cap 11 forms the ferrule or tip therefor.

I claim:—

1. A whip of the class described comprising a tubular handle member having a radial opening near its outer end, a radially movable locking pin in the said opening, the said locking pin and tubular member having co-acting devices to limit the radial movement of the locking pin, an outer member telescopically fitted in the tubular handle member and provided with a radial locking opening near its inner end, and a cap to fit in the handle member when the outer member is in retracted position and having a slot, the said locking pin having a common locking element for the outer member and for the cap, to lock either of them at the outer end of the tubular handle member.

2. A whip of the class described comprising a tubular handle member having a radial opening near its outer end and a bore on its inner side corresponding with the radial opening, an outer member telescopically fitted in the tubular handle member provided with a radial locking opening to aline with said opening of the tubular handle member when the outer member is in extended position, a cap to fit on the handle member when the outer member is in retracted position and having a slot, and a radially movable locking pin extending through the opening of the tubular handle member and having a head at its inner end to engage the locking opening of the outer member and a head at its outer end to engage the slot of the cap to lock the latter in place on the outer end of the handle member when the outer member is in retracted position in the handle member.

In testimony whereof I hereunto affix my signature in the presence of two witnesses.

WYLYE G. TOWERY.

Witnesses:
RUFUS E. DODD,
I. C. MENGER.

---

Copies of this patent may be obtained for five cents each, by addressing the "Commissioner of Patents, Washington, D. C."